US012401162B2

(12) United States Patent
Hiramatsu et al.

(10) Patent No.: US 12,401,162 B2
(45) Date of Patent: Aug. 26, 2025

(54) CONNECTOR INCLUDING SHIELD MEMBER AND LOCK PORTION

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Kazuki Hiramatsu, Mie (JP); Taiga Kadoyama, Mie (JP); Hidekazu Matsuda, Mie (JP); Masanao Yamashita, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 432 days.

(21) Appl. No.: 17/871,014

(22) Filed: Jul. 22, 2022

(65) Prior Publication Data

US 2023/0033546 A1 Feb. 2, 2023

(30) Foreign Application Priority Data

Jul. 27, 2021 (JP) ................................ 2021-122074

(51) Int. Cl.
*H01R 13/6585* (2011.01)

(52) U.S. Cl.
CPC ................................ *H01R 13/6585* (2013.01)

(58) Field of Classification Search
CPC .... H01R 13/6585–6589; H01R 13/514; H01R 13/422; H01R 13/518
USPC ...................................................... 439/607.5
See application file for complete search history.

(56) References Cited

U.S. PATENT DOCUMENTS 5,215,470 A 6/1993 Henry et al.
2018/0366843 A1 12/2018 Maki
2022/0329013 A1 * 10/2022 Büttemeyer ......... H01R 13/629

FOREIGN PATENT DOCUMENTS

JP 2008-146878 A 6/2008

OTHER PUBLICATIONS

Tsuchiya (EP 2613412A1) (Year: 2013).*
Hashimoto (JP 2020140786 A) (Year: 2020).*
Kukida (JP 324432 B2) (Year: 2002).*
Maesoba (WO 2018008374) (Year: 2018).*

* cited by examiner

*Primary Examiner* — Tulsidas C Patel
*Assistant Examiner* — Thaslimur Rahman
(74) *Attorney, Agent, or Firm* — Venjuris, P.C.

(57) ABSTRACT

A connector 10 is provided with an outer conductor 20, a plurality of dielectrics 19 to be accommodated into the outer conductor 20, inner conductors 18 to be mounted into the respective dielectrics 19, a shield member 25 to be arranged between the dielectrics 19 adjacent in the outer conductor 20, and a locking portion 26 for locking the shield member 25 to the dielectric 19.

7 Claims, 17 Drawing Sheets

CONNECTOR INCLUDING SHIELD MEMBER AND LOCK PORTION

CROSS-REFERENCE TO RELATED APPLICATIONS

This application is based on and claims priority from Japanese Patent Application No. 2021-122074, filed on Jul. 27, 2021, with the Japan Patent Office, the disclosure of which is incorporated herein in its entirety by reference.

TECHNICAL FIELD

The present disclosure relates to a connector.

BACKGROUND

Japanese Patent Laid-open Publication No. 2019-003856 discloses a configuration for mounting a plurality of dielectrics assembled with center terminals into a shield shell. In the configuration of Japanese Patent Laid-open Publication No. 2019-003856, a shield plate for shielding the center terminals from each other is arranged between adjacent ones of the dielectrics. Techniques disclosed in Japanese Patent Laid-open Publication Nos. 2008-146878 and H06-060943 are also known as techniques on connectors.

SUMMARY

A connector of Japanese Patent Laid-open Publication No. 2019-003856 is configured such that the shield plate is assembled to be inserted into a gap between the dielectrics after the dielectrics are assembled with the shield shell. In assembling the shield plate in this gap, it is thought to be difficult to grip the shield plate.

A connector of the present disclosure was completed on the basis of the above situation and aims to facilitate the assembling of a connector.

The present disclosure is directed to a connector with an outer conductor, a plurality of dielectrics to be accommodated into the outer conductor, inner conductors to be mounted into the respective dielectrics, a shield member to be arranged between the dielectrics adjacent in the outer conductor, and a locking portion for locking the shield member to the dielectric.

According to the present disclosure, a connector can be easily assembled.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
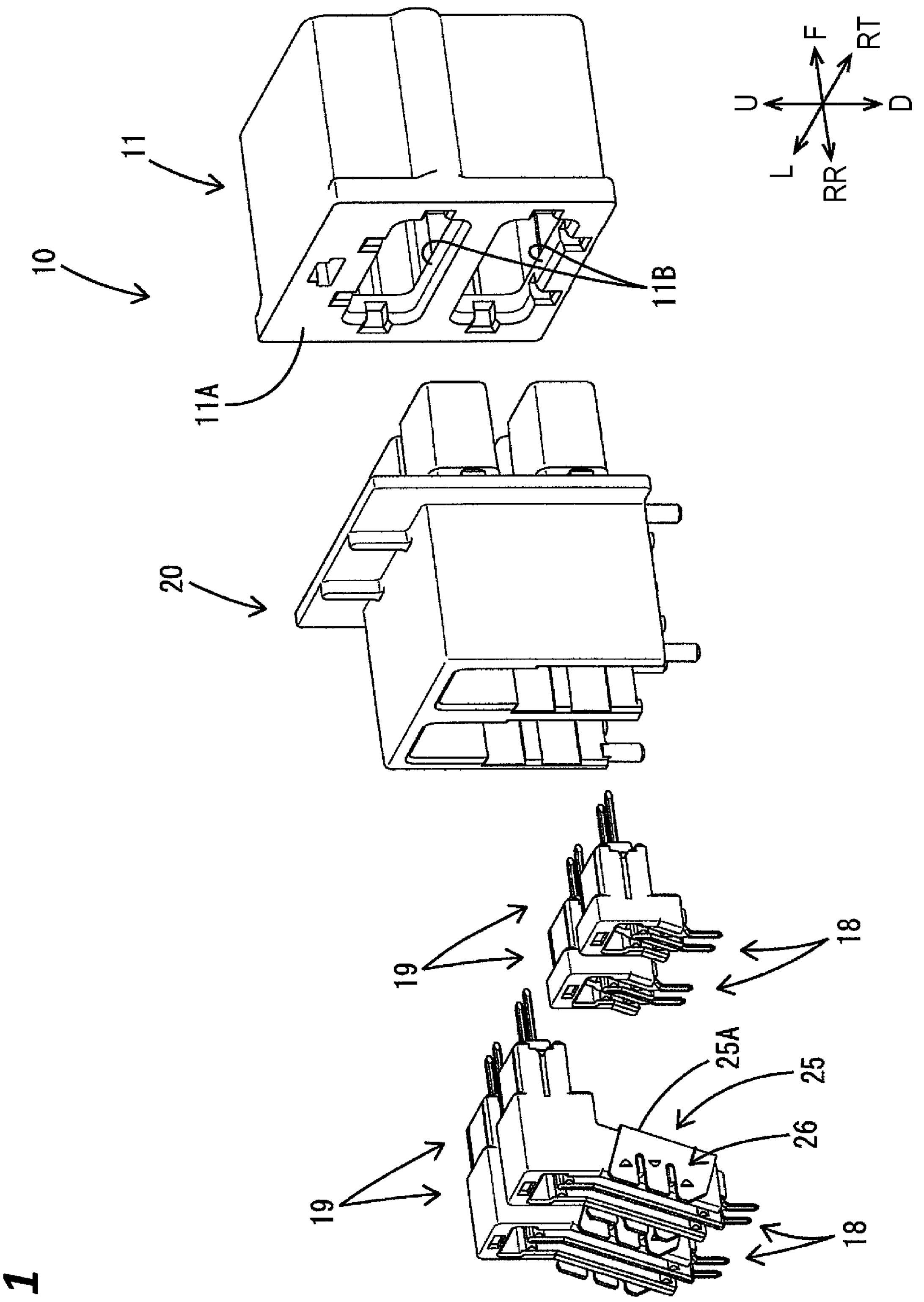
FIG. 1 is an exploded perspective view of a connector.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS OF PRESENT DISCLOSURE

First, embodiments of the present disclosure are listed and described.

(1) The connector of the present disclosure is provided with an outer conductor, a plurality of dielectrics to be accommodated into the outer conductor, inner conductors to be mounted into the respective dielectrics, a shield member to be arranged between the dielectrics adjacent in the outer conductor, and a locking portion for locking the shield member to the dielectric. According to this configuration, since the locking portion locks the shield member to the dielectric, the dielectric assembled with the shield member can be accommodated into the outer conductor. Thus, it is not necessary to perform an assembling operation such as the insertion of the shield member into the outer conductor with the shield member gripped, and the connector can be easily assembled.

(2) The dielectrics may include a first dielectric located on a front side in an assembling direction with the outer conductor and a second dielectric located behind the first dielectric in the assembling direction, and the shield member may be locked to the second dielectric by the locking portion. According to this configuration, if the first dielectric having the shield member locked thereto is accommodated into the outer conductor, there is a concern that the second dielectric accommodated into the outer conductor later accidentally contacts the shield member and the shield member deviates from a proper position. In contrast, if the shield member is locked to the second dielectric located behind the first dielectric in the assembling direction (i.e. if the second dielectric is accommodated into the outer conductor after the first dielectric), the shield member can be made less likely to deviate from the proper position.

(3) The shield member may include a pair of sandwiching portions facing each other at a distance from each other, the second dielectric may have a pair of side surfaces facing the respective sandwiching portions, and the locking portion may be provided on the respective side surfaces of the second dielectric and the respective sandwiching portions. According to this configuration, the shield member can be easily locked to the second dielectric by being sandwiched by the sandwiching portions.

(4) The locking portion may include protrusions projecting from the respective side surfaces and extending in the assembling direction and grooves formed in the respective sandwiching portions and extending in the assembling direction, and the protrusions may be fit into the grooves. According to this configuration, the shield member and the second dielectric can be prevented from being separated in a direction intersecting the assembling direction.

(5) The shield member may be arranged forward of the second dielectric, and the sandwiching portions may include first restricting claws for restricting forward separation of the shield member by being locked to the second dielectric. According to this configuration, since the forward separation of the shield member from the second dielectric is restricted by the first restricting claws, the shield member can be maintained in a state locked to the second dielectric.

(6) The sandwiching portions may be sandwiched by the side surfaces of the second dielectric and inner surfaces of the outer conductor with the second dielectric accommodated in the outer conductor, and the sandwiching portions may include second restricting claws to be locked to the inner surfaces of the outer conductor. According to this configuration, the second dielectric can be indirectly held in a state accommodated in the outer conductor by the sandwiching portions including the second restricting claws, and the separation of the second dielectric from the outer conductor can be suppressed.

DETAILS OF EMBODIMENT OF PRESENT DISCLOSURE

Embodiment

One embodiment of the technique disclosed in this specification is described below with reference to FIGS. 1 to 17. A connector 10 according to this embodiment is mounted on an unillustrated circuit board. In the following description, upper and lower sides shown in FIG. 1 are directly defined as upper and lower sides concerning a vertical direction. A right side and a left side in FIG. 1 are defined as a front side and a rear side concerning a front-rear direction. A forward direction is a connecting direction of the connector 10 to an unillustrated mating connector. A back side and a front side of FIG. 1 are defined as a left side and a right side concerning a lateral direction.

As shown in FIG. 1, the connector 10 is provided with an outer conductor 20, a housing 11 for accommodating the outer conductor 20, a plurality of dielectrics 19 to be accommodated into the outer conductor 20, inner conductors 18 to be respectively mounted into these dielectrics 19, shield members 25 to be mounted on the dielectrics 19, and locking portions 26 for locking the shield members 25 to the dielectrics 19.

[Outer Conductor]

The outer conductor 20 is made of electrically conductive metal. A metal such as copper, copper alloy, aluminum or aluminum alloy is used for the outer conductor 20. The outer conductor 20 is formed by a known method such as casting, die casting or cutting. In the case of this embodiment, the outer conductor 20 is made of die casting, specifically, made of die casting zinc or zinc alloy.

Figure 2:
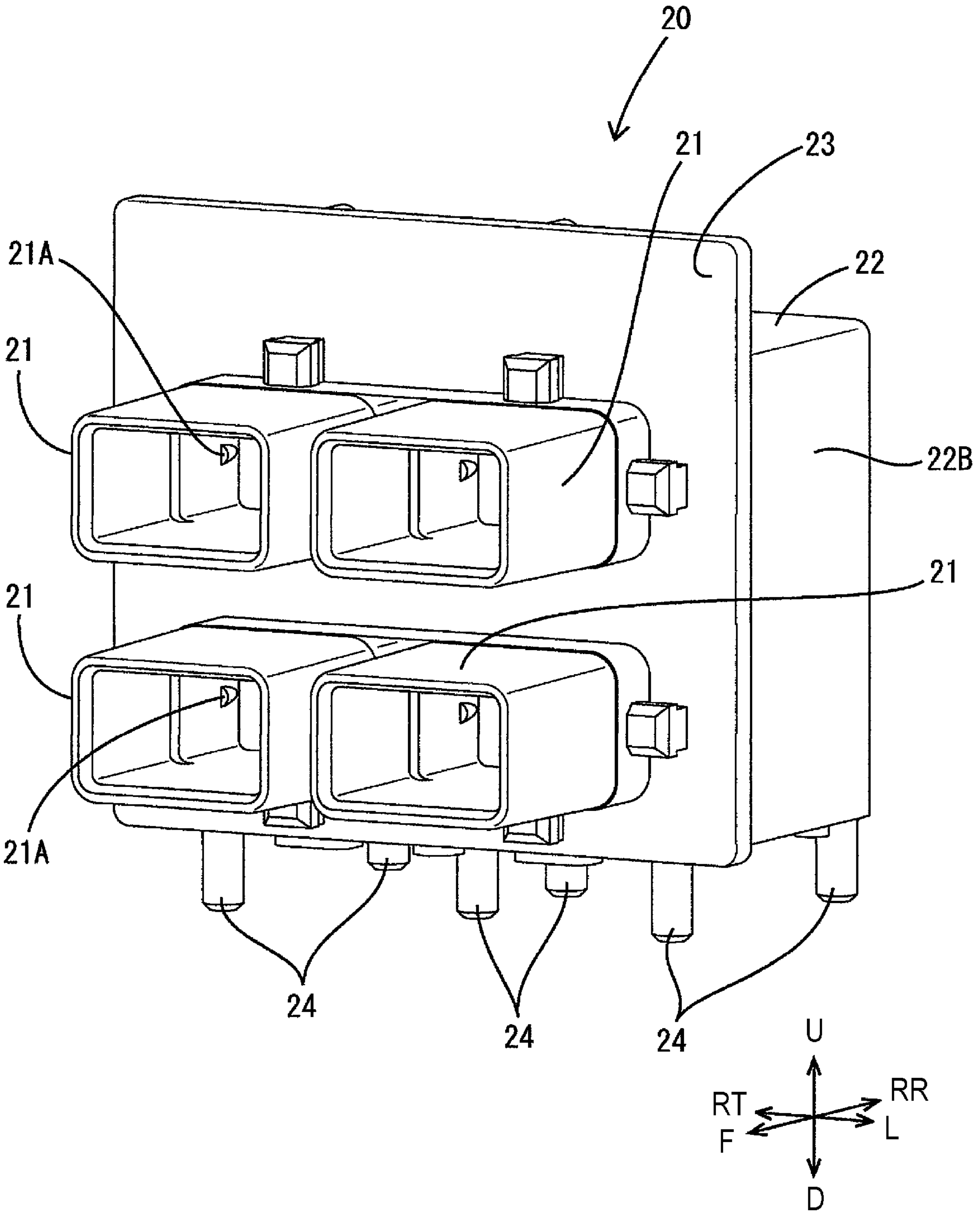
FIG. 2 is a perspective view of an outer conductor viewed obliquely from front.
Figure 3:
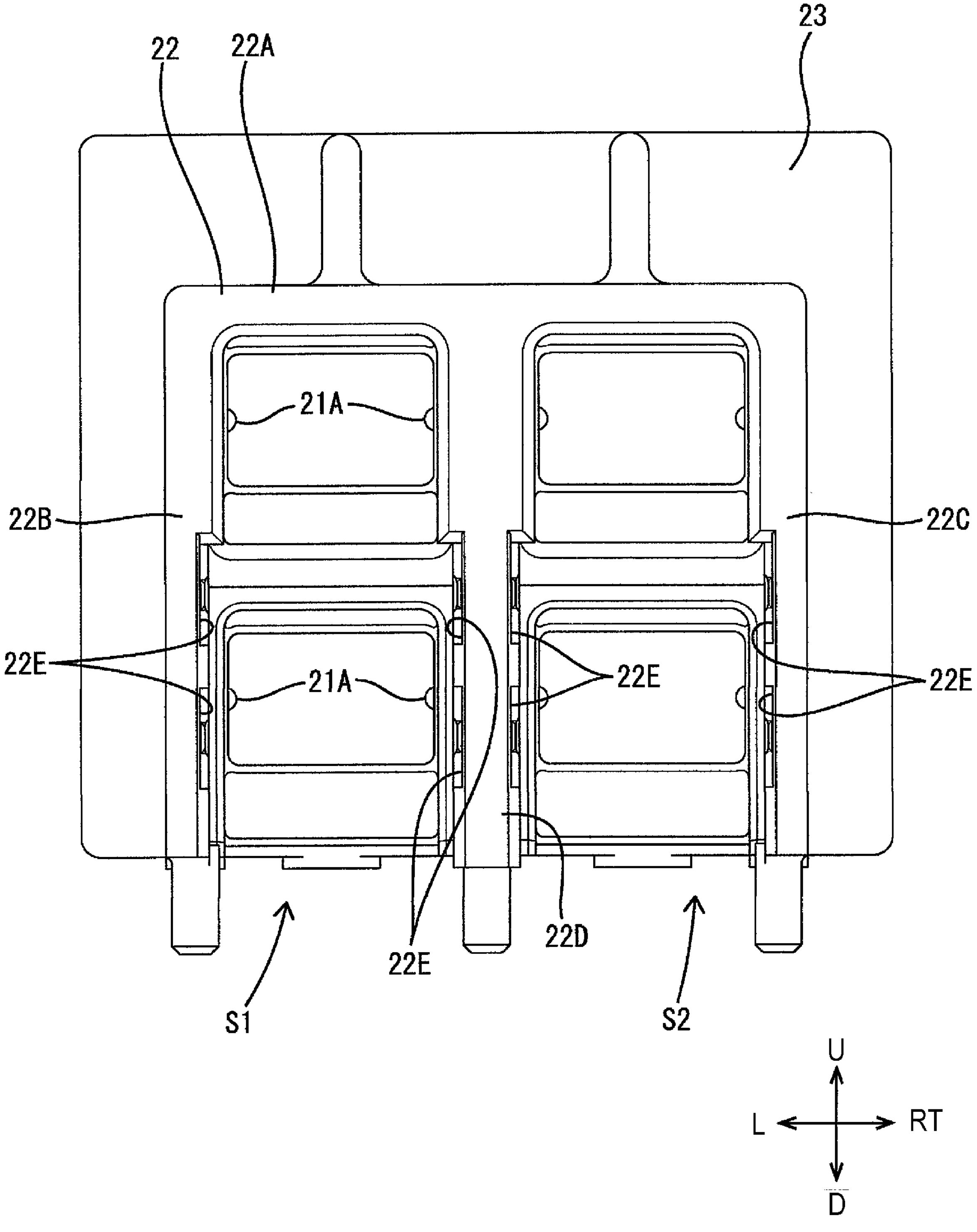
FIG. 3 is a back view of the outer conductor.

As shown in FIGS. 2 and 3, the outer conductor 20 includes four tube portions 21, a dielectric surrounding portion 22 and a flange 23. The four tube portions 21 are in the form of rectangular tubes with arcuate corners and extend in the front-rear direction. The dielectric surrounding portion 22 extends rearward of the rear end edges of these tube portions 21. The flange 23 expands in directions intersecting the front-rear direction on a boundary part between the four tube portions 21 and the dielectric surrounding portion 22.

The four tube portions 21 are two pairs of the tube portions 21 arranged in the lateral direction in two upper and lower stages. Projecting portions 21A facing and projecting toward each other are provided on respective inner surfaces of left and right side walls forming each tube portion 21 (see FIGS. 2 and 3). The projecting portion 21A is formed to project inward toward a front end, and the front end extends in the lateral direction (see FIGS. 2, 9 and 14).

The plurality of dielectrics 19 are accommodated into the dielectric surrounding portion 22. The dielectric surrounding portion 22 has an upper wall 22A, a left wall 22B, a right wall 22C and a lateral center wall 22D. The upper wall 22A expands in a direction intersecting the vertical direction and extends rearward from the rear surface of the flange 23. The left wall 22B expands in a direction intersecting the lateral direction and extends rearward from the rear surface of the flange 23 while hanging down from the left end edge of the upper wall 22A. The right wall 22C expands in a direction intersecting the lateral direction and extends rearward from the rear surface of the flange 23 while hanging down from the right end edge of the upper wall 22A. The lateral center wall 22D expands in a direction intersecting the lateral direction and extends rearward from the rear surface of the flange 23 while hanging down from a laterally central part of the upper wall 22A.

As shown in FIG. 3, the dielectric surrounding portion 22 has a left space S1 surrounded by the upper wall 22A, the left wall 22B and the lateral center wall 22D and a right space S2 surrounded by the upper wall 22A, the right wall 22C and the lateral center wall 22D.

A pair of recesses 22E are formed in each of a side surface of the left wall 22B and a side surface of the lateral center wall 22D facing the left space S1. The pair of recesses 22E are arranged one above the other in each side surface. The pair of recesses 22E formed in the side surface of the left wall 22B facing the left space S1 and the pair of recesses 22E formed in the side surface of the lateral center wall 22D facing the left space S1 are recessed outward in the lateral direction (i.e. in directions away from each other).

A pair of recesses 22E are also formed in each of a side surface of the right wall 22C and a side surface of the lateral center wall 22D facing the right space S2. The pair of recesses 22E are arranged one above the other in each side surface.

As shown in FIG. 2, two projections 24 having a cylindrical shape and projecting downward are provided on the lower end edge of each of the left wall 22B, the right wall 22C and the lateral center wall 22D. The projections 24 are positioned and inserted into mounting holes formed in the circuit board.

[Housing]

The housing 11 is made of insulating synthetic resin. As shown in FIG. 1, in the form of a rectangular tube having an open front end. A back wall 11A is provided on an end part (rear end) of the housing 11 distant from an opening end. Two holes 11B are formed one above the other in the back wall 11A while penetrating through the back wall 11A in the front-rear direction. The tube portions 21 of the outer conductor 20 are inserted into the holes 11B. With the tube portions 21 of the outer conductor 20 inserted in the holes 11B, the flange 23 is in contact with the rear surface of the back wall 11A from behind, whereby the outer conductor 20 and the housing 11 are coupled (see FIG. 17).

[Dielectrics]

Figure 4:
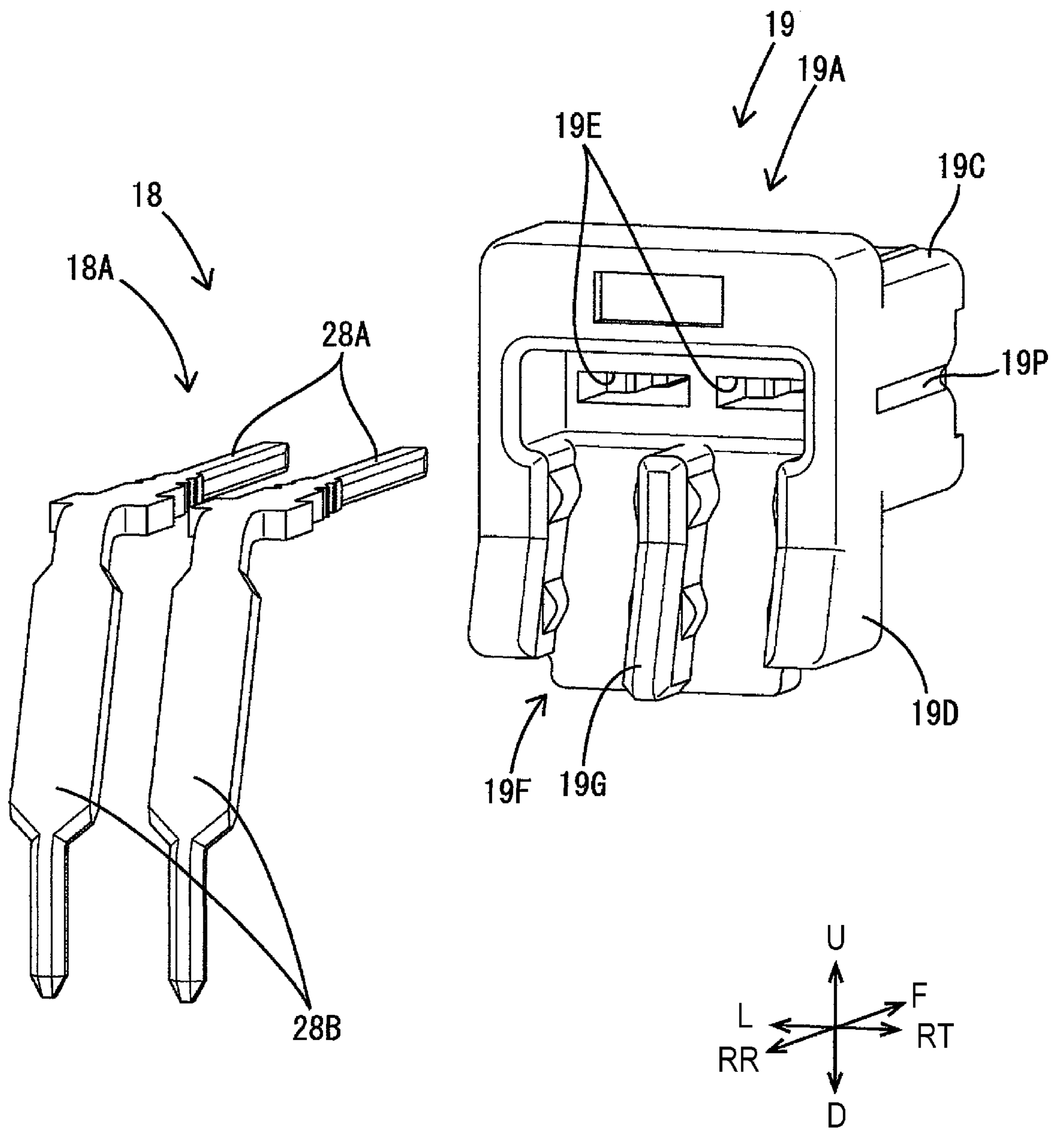
FIG. 4 is an exploded perspective view showing a first dielectric and first inner conductors.
Figure 5:
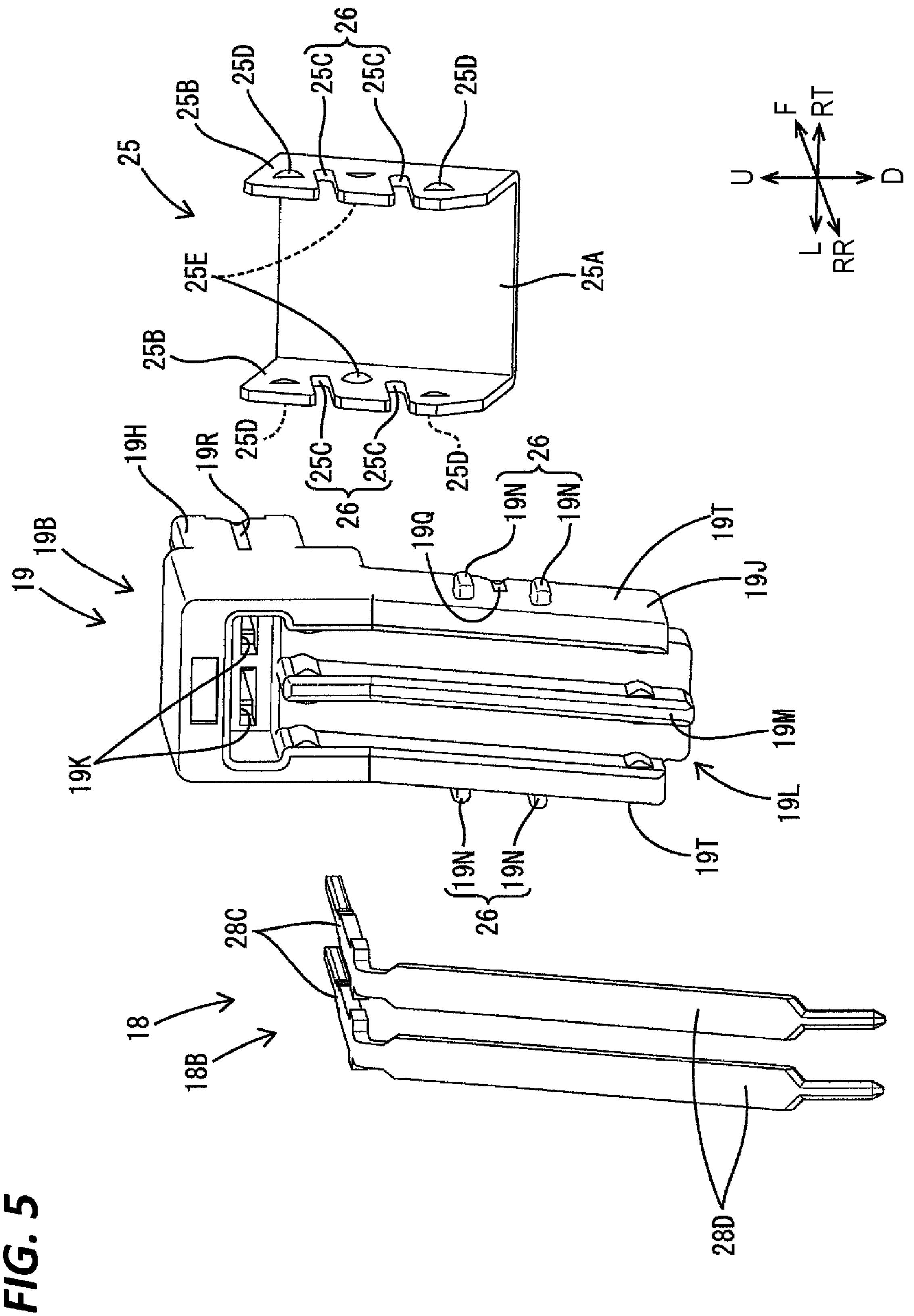
FIG. 5 is an exploded perspective view showing a second dielectric, second inner conductors and a shield member.

The dielectrics 19 are made of insulating synthetic resin. As shown in FIGS. 4 and 5, the dielectrics 19 include first dielectrics 19A and second dielectrics 19B. The first dielectric 19A includes a fixing portion 19C extending in the front-rear direction and a guiding portion 19D projecting downward from a rear side of the fixing portion 19C. The fixing portion 19C is formed with two through holes 19E arranged in the lateral direction and penetrating in the front-rear direction. Recesses 19P recessed laterally inward are formed to extend rearward from front ends in left and right side surfaces of the fixing portion 19C (see FIG. 9). The guiding portion 19D is formed with an inner conductor accommodation chamber 19F recessed forward and open rearward and downward. A partition wall 19G extending in the vertical direction and projecting rearward is provided in a laterally central part of the inner conductor accommodation chamber 19F to partition the inner conductor accommodation chamber 19F into left and right sides.

The second dielectric 19B includes a fixing portion 19H extending in the front-rear direction and a guiding portion 19J extending downward from a rear side of the fixing portion 19H. The fixing portion 19H is formed with two through holes 19K arranged in the lateral direction and penetrating in the front-rear direction. Recesses 19R recessed laterally inward are formed to extend rearward from front ends in left and right side surfaces of the fixing portion 19H (see FIG. 14). The guiding portion 19J is formed with an inner conductor accommodation chamber 19L recessed forward and open rearward and downward. Laterally outer surfaces of the guiding portion 19J are a pair of side surfaces 19T. That is, the second dielectric 19B has the pair of side surfaces 19T. A partition wall 19M extending in the vertical direction and projecting rearward is provided in a laterally central part of the inner conductor accommodation chamber 19L to partition the inner conductor accommodation chamber 19L into left and right sides. A vertical dimension of the guiding portion 19D of the first dielectric 19A is set shorter than that of the guiding portion 19J of the second dielectric 19B.

Two protrusions 19N and a recess 19Q, which constitute the locking portion 26, are formed on each of the side surfaces 19T of the guiding portion 19J. The two protrusions 19N project laterally outward and extend in the front-rear direction. The two protrusions 19N are arranged one above the other on the side surface 19T. The recess 19Q is recessed laterally inward and extends rearward from a front end (see FIG. 12). The recess 19Q is arranged between the two protrusions 19N in the vertical direction.

[Inner Conductors]

The inner conductors 18 are formed by bending a strip-like metal plate at an intermediate position. A metal such as copper, copper alloy, aluminum or aluminum alloy is used for the inner conductors 18. As shown in FIGS. 4 and 5, the inner conductors 18 include first inner conductors 18A and second inner conductors 18B. The first inner conductor 18A includes a straight portion 28A extending in the front-rear direction and a bent portion 28B bent from the rear end of the straight portion 28A and extending downward.

The second inner conductor 18B includes a straight portion 28C extending in the front-rear direction and a bent portion 28D bent from the rear end of the straight portion 28C and extending downward. A dimension in the front-rear direction of the straight portion 28A is set shorter than that of the straight portion 28C. A vertical dimension of the bent portion 28B of the first inner conductor 18A is set shorter than that of the bent portion 28D of the second inner conductor 18B.

[Shield Members]

Figure 6:
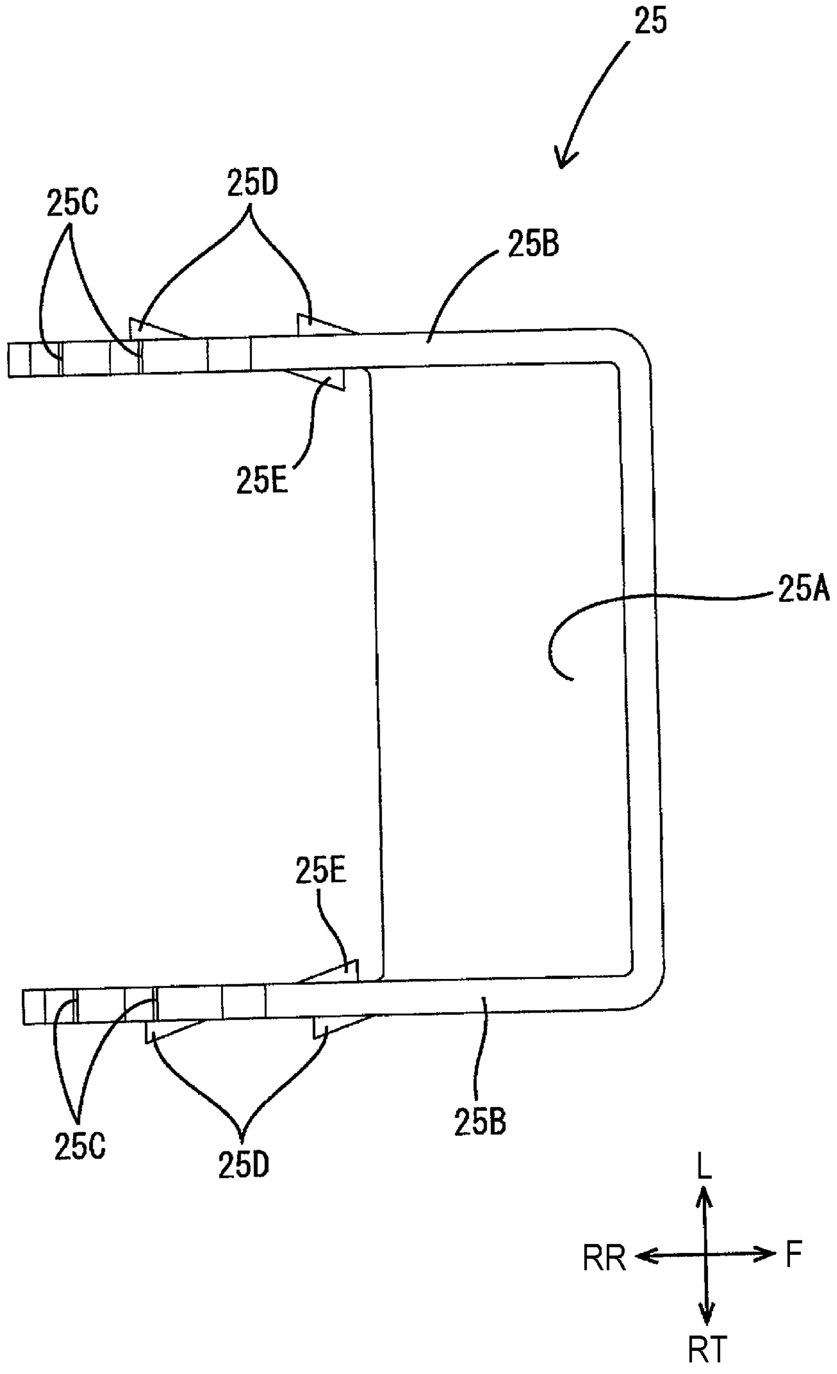
FIG. 6 is a plan view of the shield member.

The shield member 25 is formed by bending both left and right end parts of a metal plate in the same direction. A metal such as copper, copper alloy, aluminum or aluminum alloy is used for the shield member 25. As shown in FIGS. 5 and 6, the shield member 25 includes a shielding body portion 25A and a pair of sandwiching portions 25B. The shielding body portion 25A is a flat plate having a rectangular outer shape and expands obliquely rearward toward a lower end while intersecting the front-rear direction (see FIG. 1). The pair of sandwiching portions 25B are bent rearward at a right angle to the shielding body portion 25A from the respective left and right end edges of the shielding body portion 25A. The pair of sandwiching portions 25B are facing each other in parallel at a distance from each other.

Each sandwiching portion 25B includes two grooves 25C constituting the locking portion 26, two outer projecting portions 25D serving as second restricting claws, and one inner projecting portion 25E serving as a first restricting claw. The two sandwiching portions 25B are symmetrically configured with respect to a lateral center of the shielding body portion 25A. Accordingly, the configuration of one of the left and right sandwiching portions 25B is described and that of the other sandwiching portion 25B is not described.

As shown in FIG. 5, an end edge of the sandwiching portion 25B on a side distant from the shielding body portion 25A (i.e. rear end edge) is recessed forward to form the two grooves 25C. These grooves 25C are arranged one above the other on the sandwiching portion 25B. In the sandwiching portion 25B, each of parts divided into three in the vertical direction by the two grooves 25C is resiliently deformable in the lateral direction. An extending direction of these grooves 25C is inclined with respect to a plate thickness direction of the shielding body portion 25A.

As shown in FIG. 6, two outer projecting portions 25D project in a direction away from the adjacent sandwiching portion 25B (i.e. laterally outward). Specifically, these outer projecting portions 25D are formed by striking to project laterally outward toward rear ends, and the rear ends extend in the lateral direction. In one sandwiching portion 25B, one outer projecting portion 25D is arranged above the upper groove 25C and the other outer projecting portion 25D is arranged below the lower groove 25C (see FIG. 5).

The inner projecting portion 25E projects in a direction toward the adjacent sandwiching portion 25B (i.e. laterally inward). Specifically, the inner projecting portion 25E is formed by striking to project laterally inward toward a front end, and the front end extends in the lateral direction. The inner projecting portion 25E is arranged between the upper groove 25C and the lower groove 25C (see FIG. 5).

[Locking Portions]

As shown in FIG. 5, the locking portions 26 are provided on the respective side surfaces 19T of the second dielectric 19B and the respective sandwiching portions 25B. Specifically, the locking portions 26 are constituted by a plurality of the protrusions 19N provided to project laterally outward from the respective side surfaces 19T of the second dielectric 19B and a plurality of the grooves 25C formed in the respective sandwiching portions 25B.

[Assembling Process of Connector]

Next, an example of an assembling process of the connector 10 is described. The assembling process of the connector 10 is not limited to the one described below.

Figure 7:
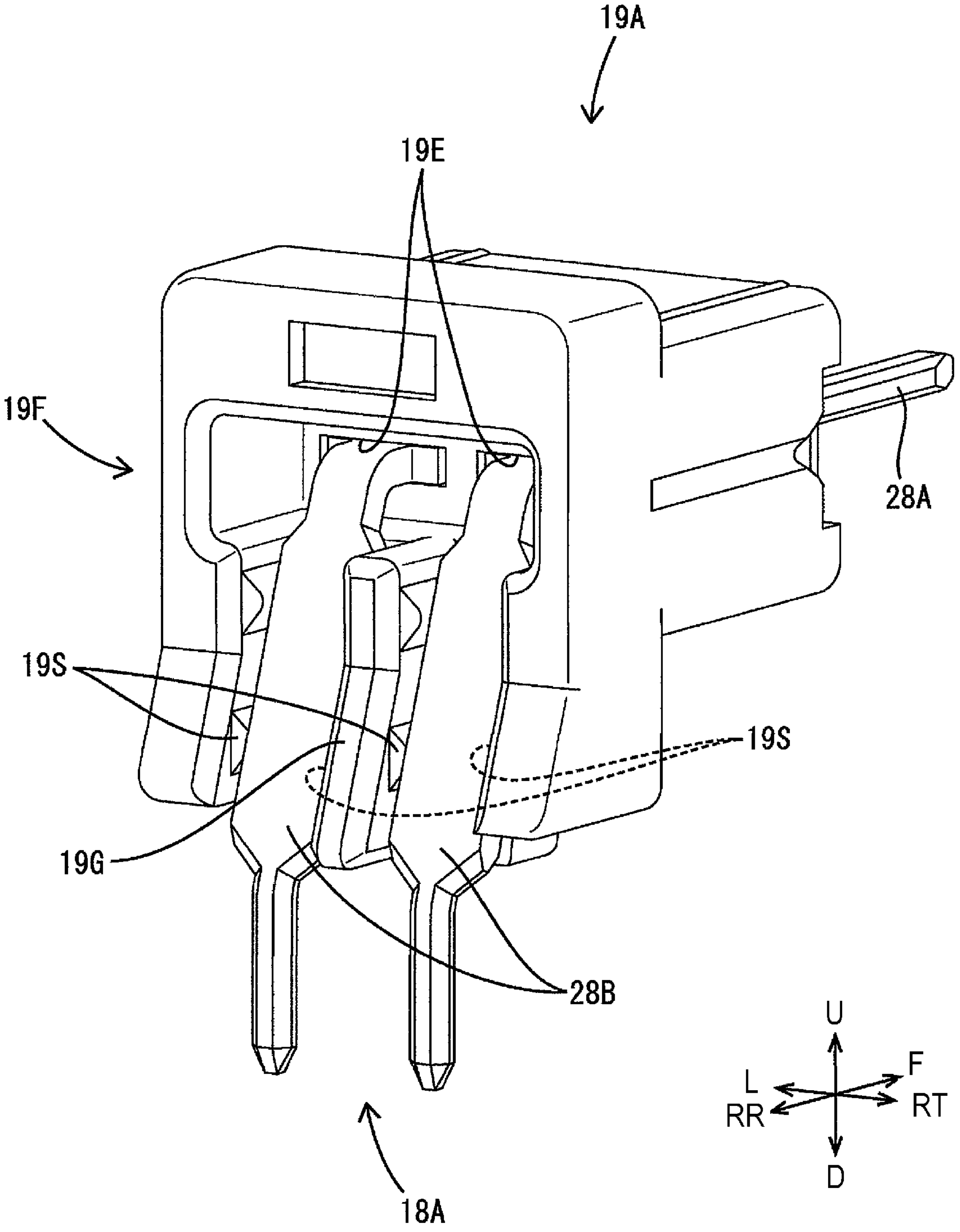
FIG. 7 is a perspective view showing a state where the first inner conductors are mounted in the first dielectric.

First, as shown in FIG. 7, two first inner conductors 18A are mounted into the first dielectric 19A from behind. Specifically, the respective straight portions 28A are press-fit into the respective through holes 19E from behind. Along with this, the respective bent portions 28B are accommodated into the inner conductor accommodation chamber 19F partitioned by the partition wall 19G. The respective bent portions 28B accommodated in the inner conductor accommodation chamber 19F are held not to come out from the inner conductor accommodation chamber 19F by ribs 19S provided in the inner conductor accommodation chamber 19F. In this way, two first dielectrics 19A, in each of which two first inner conductors 18A are mounted, are prepared.

Figure 8:
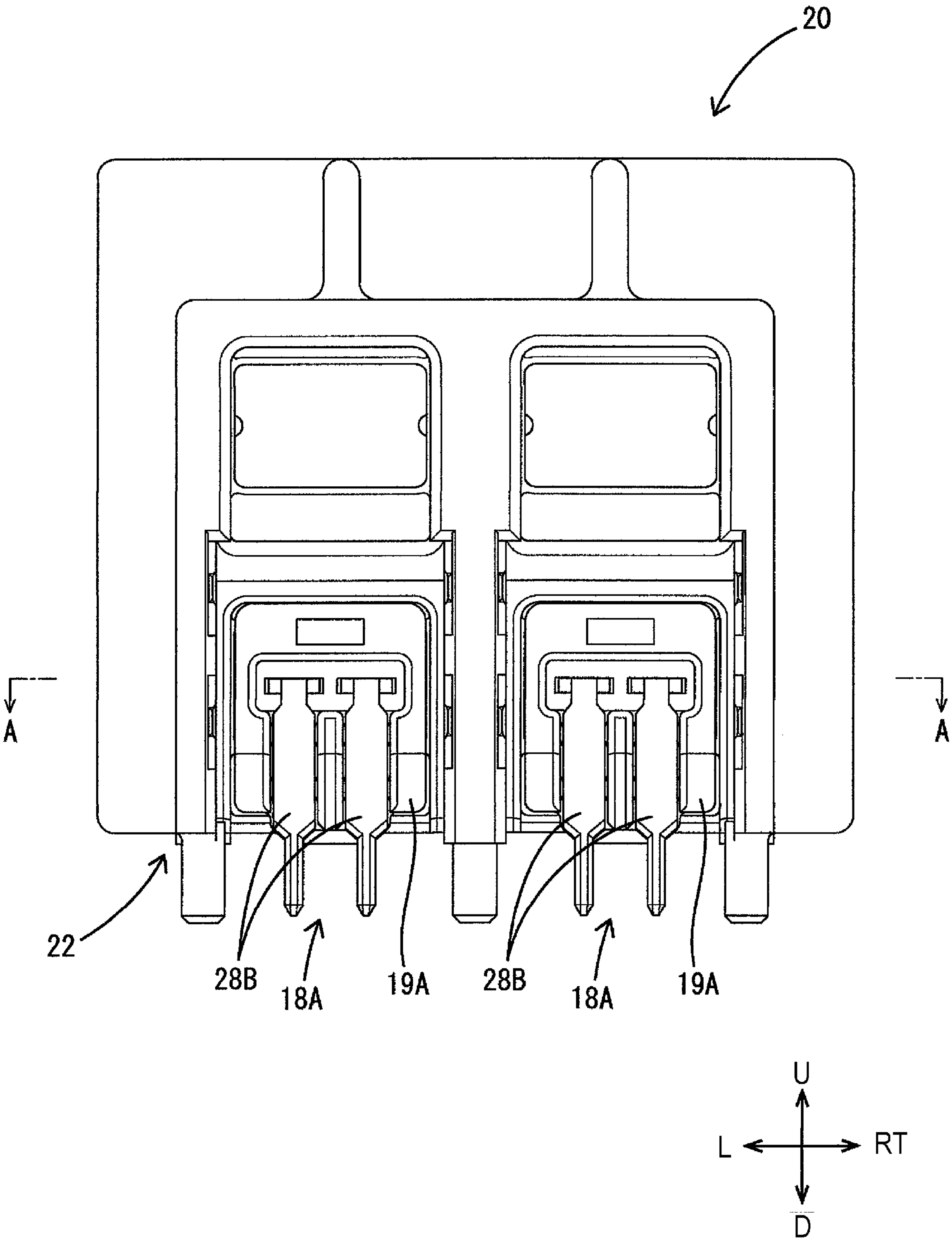
FIG. 8 is a back view of the outer conductor having the first dielectrics accommodated therein.
Figure 9:
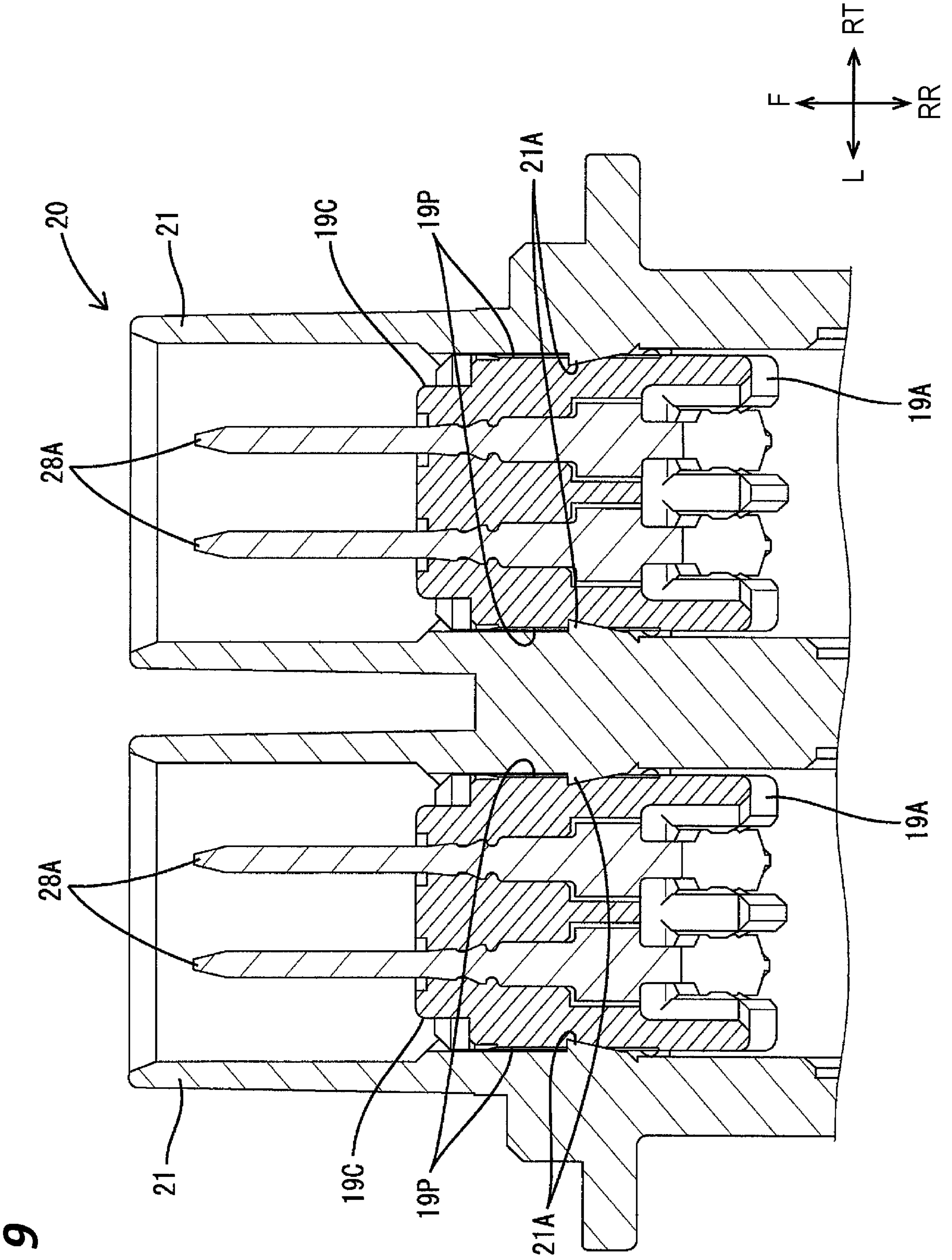
FIG. 9 is a section along A-A in FIG. 8.

Subsequently, as shown in FIG. 8, the first dielectrics 19A each mounted with the first inner conductors 18A are accommodated into the outer conductor 20. Specifically, as shown in FIG. 9, the fixing portions 19C of the first dielectrics 19A are respectively press-fit into two tube portions 21 on a lower side, out of the tube portions 21 of the outer conductor 20, from behind. At this time, the projecting portions 21A of the tube portion 21 are inserted into the recesses 19P of the fixing portion 19C from the front ends of the recesses 19P. When the press-fitting of the fixing portion 19C into the tube portion 21 is completed, the projecting portions 21A reach central parts in the front-rear direction of the recesses 19P and slightly bite into both left and right side surfaces of the fixing portion 19C and are locked. In this way, the fixing portion 19C of the first dielectric 19A is restricted from coming out from the tube portion 21 of the outer conductor 20.

Figure 10:
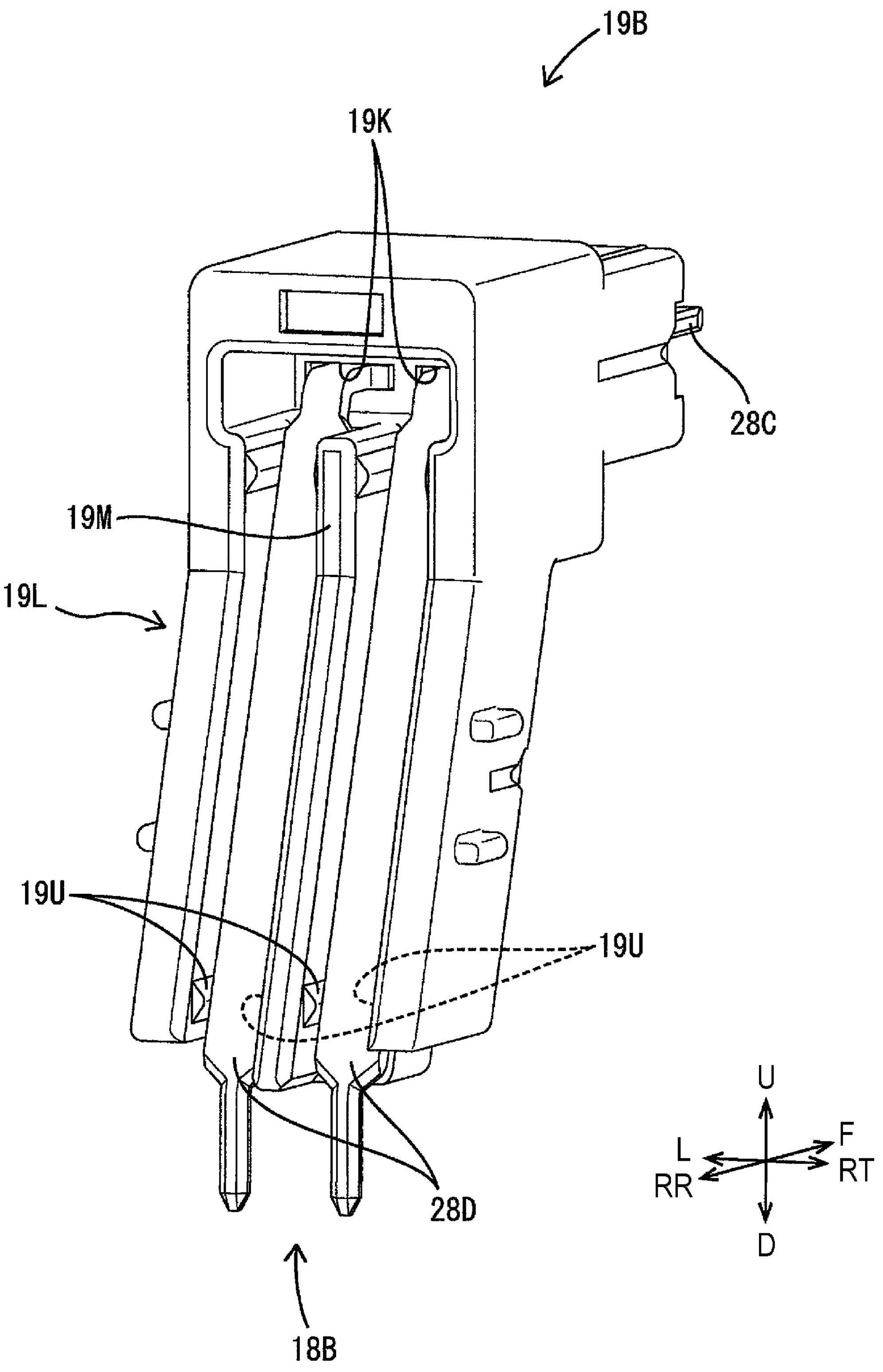
FIG. 10 is a perspective view showing a state where the second inner conductors are mounted in the second dielectric.

Subsequently, as shown in FIG. 10, two second inner conductors 18B are mounted into the second dielectric 19B from behind. Specifically, the respective straight portions 28C are press-fit into the respective through holes 19K from behind. Along with this, the respective bent portions 28D are accommodated into the inner conductor accommodation chamber 19L partitioned by the partition wall 19M. The respective bent portions 28D accommodated in the inner conductor accommodation chamber 19L are held not to come out from the inner conductor accommodation chamber 19L by ribs 19U provided in the inner conductor accommodation chamber 19L. In this way, two second dielectrics 19B, in each of which two second inner conductors 18B are mounted, are prepared.

Figure 11:
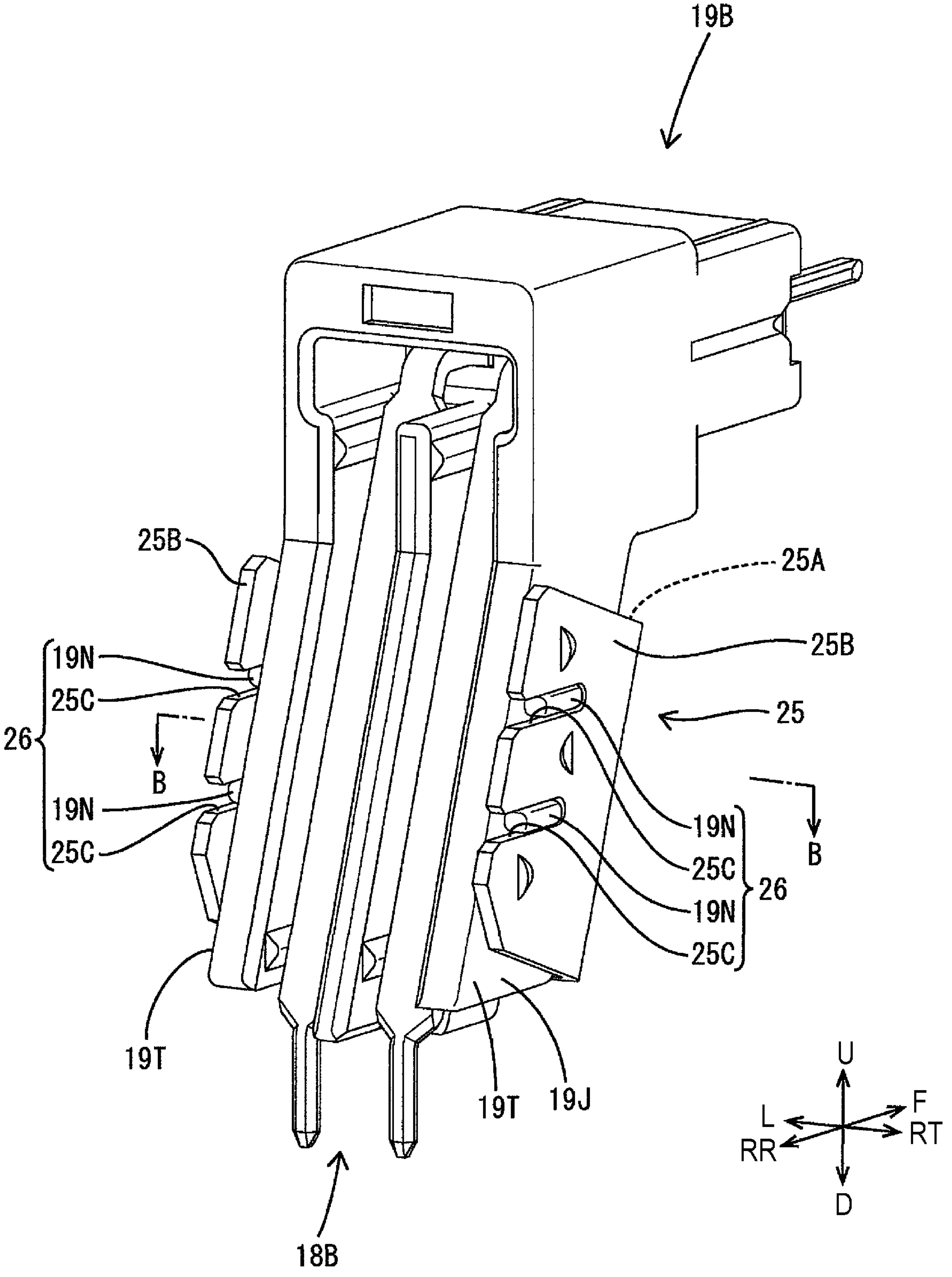
FIG. 11 is a perspective view showing a state where the shield member is mounted on the second dielectric.

Subsequently, as shown in FIG. 11, the shield member 25 is mounted on each second dielectric 19B from front. Specifically, the shield member 25 is so oriented that the pair of sandwiching portions 25B project rearward from the shielding body portion 25A. Then, the respective protrusions 19N of the guiding portion 19J are fit into the respective grooves 25C of the sandwiching portions 25B from behind. Then, the front ends of the respective protrusions 19N are brought to front end parts of the respective grooves 25C. At this time, the respective sandwiching portions 25B are facing along the respective side surfaces 19T of the guiding portion 19J. At this time, the respective grooves 25C of the sandwiching portions 25B extend in an assembling direction of the first dielectric 19A with the outer conductor 20 (i.e. front-rear direction and also merely referred to as an assembling direction below). Further, the respective protrusions 19N are also oriented to extend in the assembling direction and fit into the respective grooves 25C.

Figure 12:
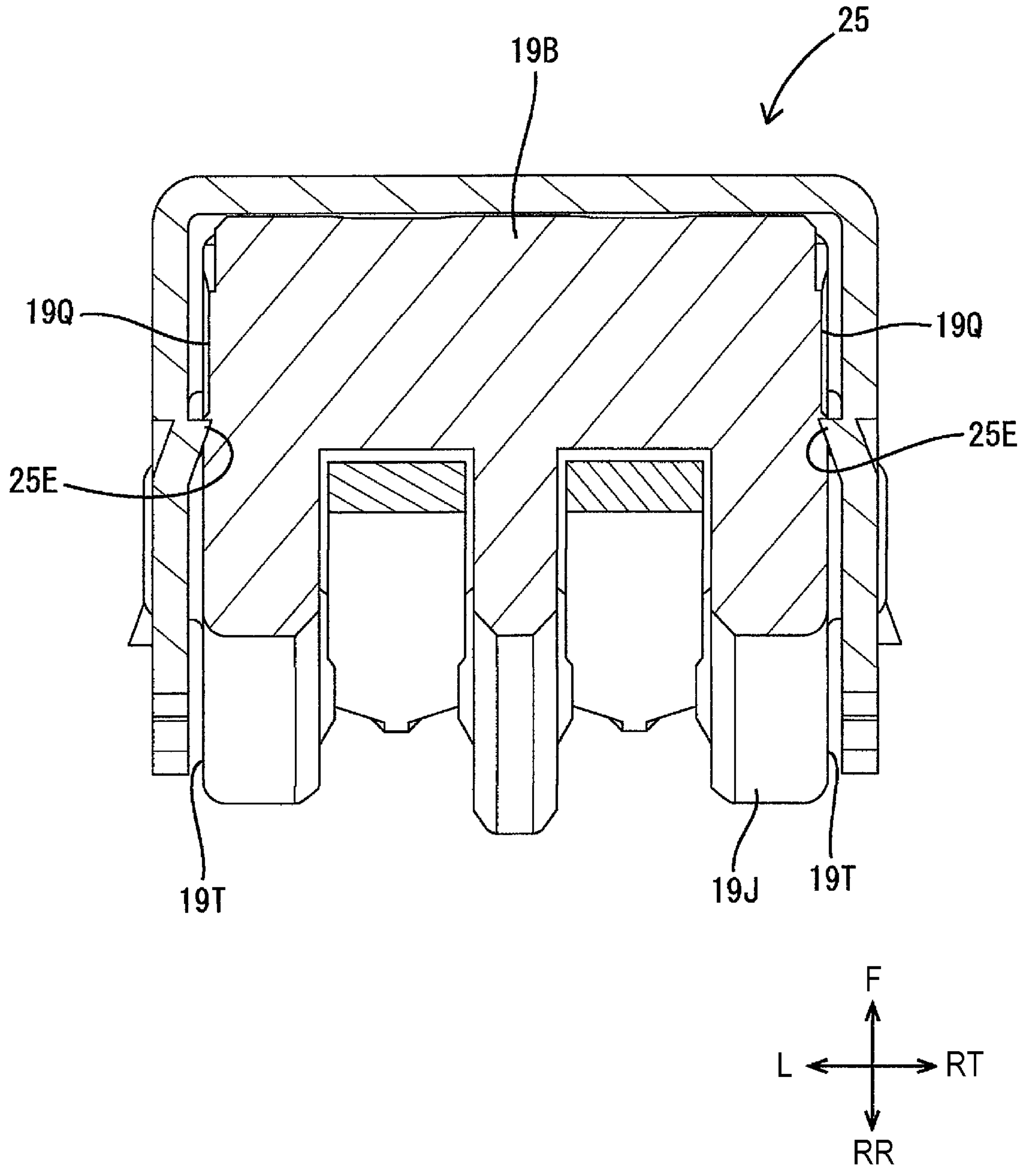
FIG. 12 is a section along B-B in FIG. 11.

At this time, as shown in FIG. 12, the inner projecting portions 25E provided on the sandwiching portions 25B are inserted rearward into the recesses 19Q of the guiding portion 19J from the front ends of the recesses 19Q. When reaching positions behind the rear ends of the recesses 19Q, the inner projecting portions 25E slightly bite into the side surfaces 19T of the guiding portion 19J of the second dielectric 19B and are locked. At this time, the shielding body portion 25A is arranged along the front surface of the guiding portion 19J. In this way, the inner projecting portions 25E restrict the forward separation of the shield member 25 from the second dielectric 19B. In this way, the shield member 25 is locked to the second dielectric 19B by the locking portions 26 and the inner projecting portions 25E.

Figure 13:
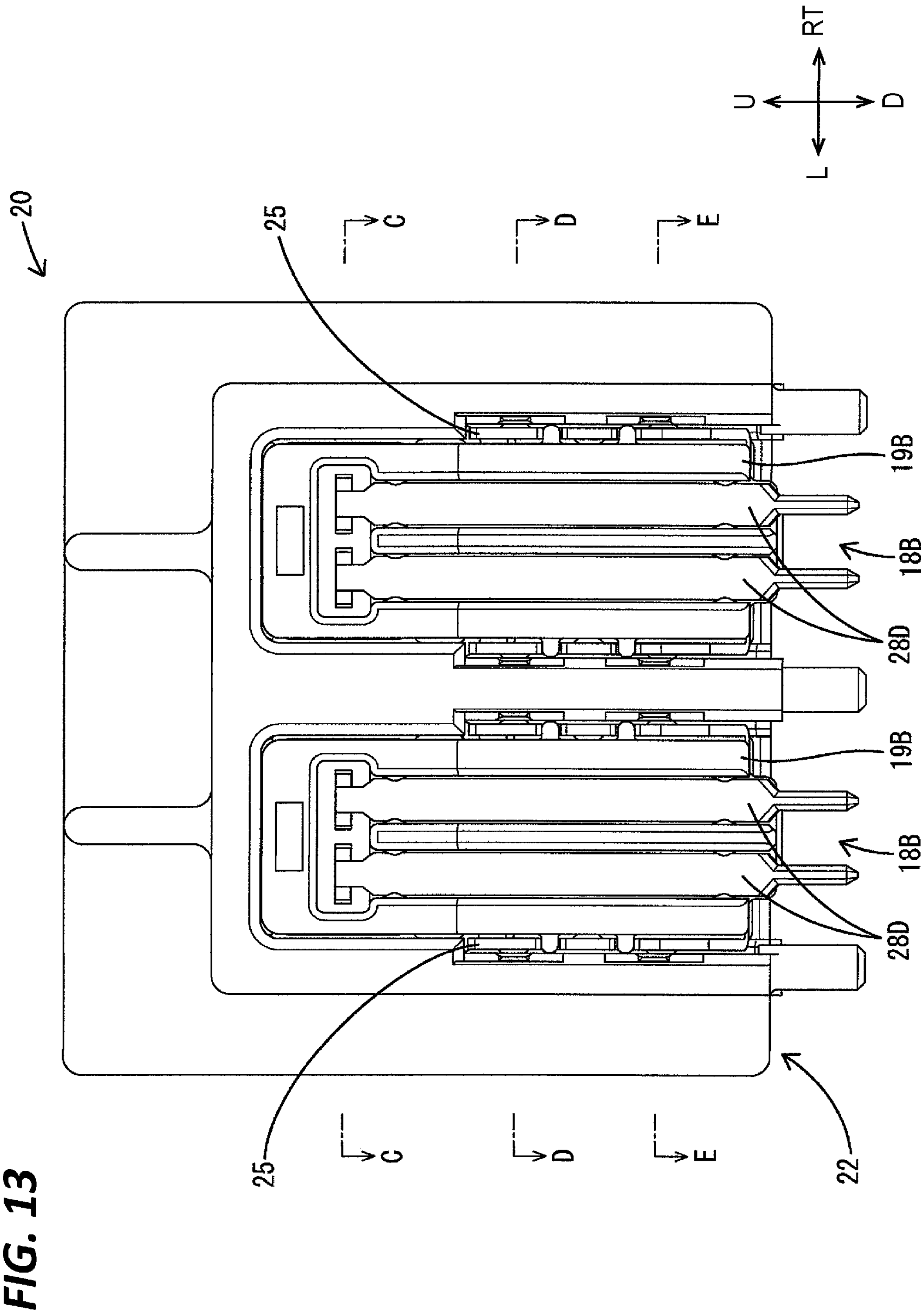
FIG. 13 is a back view of the outer conductor having the second dielectrics accommodated therein.
Figure 14:
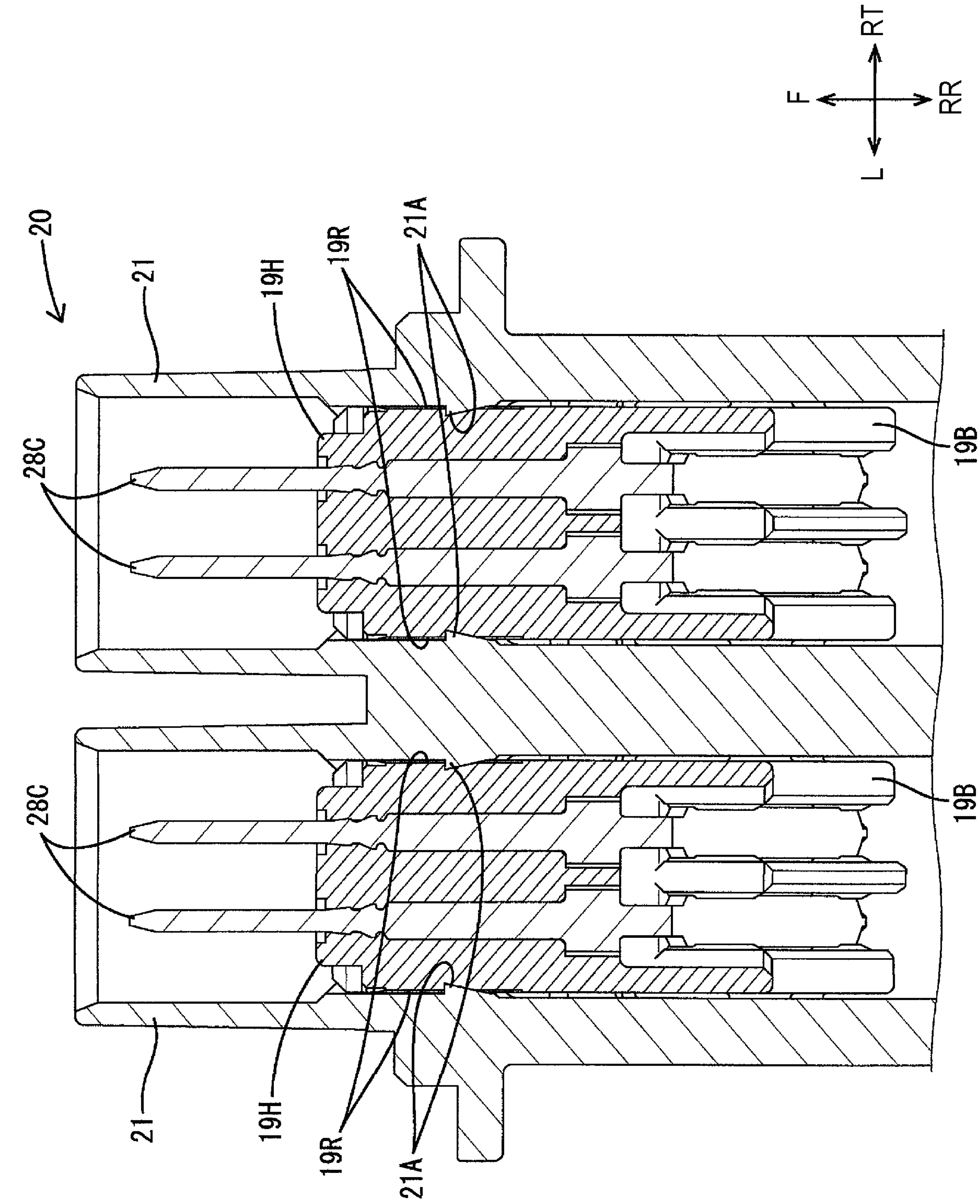
FIG. 14 is a section along C-C in FIG. 13.

Subsequently, as shown in FIG. 13, the second dielectrics 19B each mounted with the second inner conductors 18B and the shield member 25 are accommodated into the outer conductor 20. Specifically, as shown in FIG. 14, the fixing portions 19H of the second dielectrics 19B are respectively press-fit into two tube portions 21 on an upper side, out of the tube portions 21 of the outer conductor 20, from behind. At this time, the projecting portions 21A of the tube portion 21 are inserted rearward into the recesses 19R of the fixing portion 19H from the front ends of the recesses 19R. When the press-fitting of the fixing portion 19H into the tube portion 21 is completed, the projecting portions 21A reach central parts in the front-rear direction of the recesses 19R and slightly bite into both left and right side surfaces of the fixing portion 19H and are locked. In this way, the fixing portion 19H of the second dielectric 19B is restricted from coming out from the tube portion 21 of the outer conductor 20.

Figure 15:
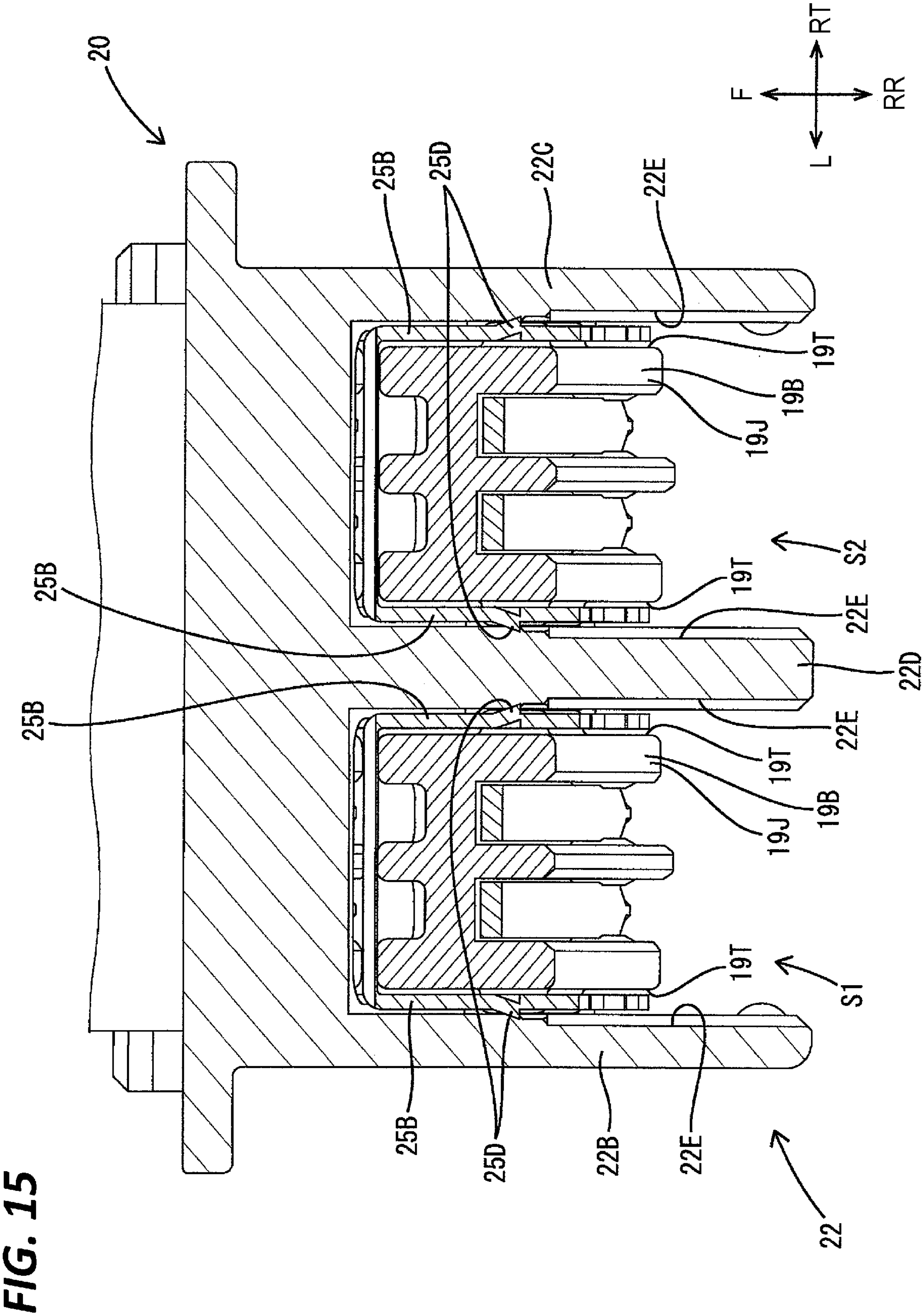
FIG. 15 is a section along D-D in FIG. 13.

The guiding portions 19J of the respective second dielectrics 19B are respectively accommodated into the left space S1 and the right space S2. At this time, as shown in FIG. 15, in the left space S1, the left sandwiching portion 25B extends along the side surface of the left wall 22B facing the left space S1 and the right sandwiching portion 25B extends along the side surface of the lateral center wall 22D facing the left space S1. Further, in the right space S2, the left sandwiching portion 25B extends along the side surface of the lateral center wall 22D facing the right space S2 and the right sandwiching portion 25B extends along the side surface of the right wall 22C facing the right space S2.

Figure 16:
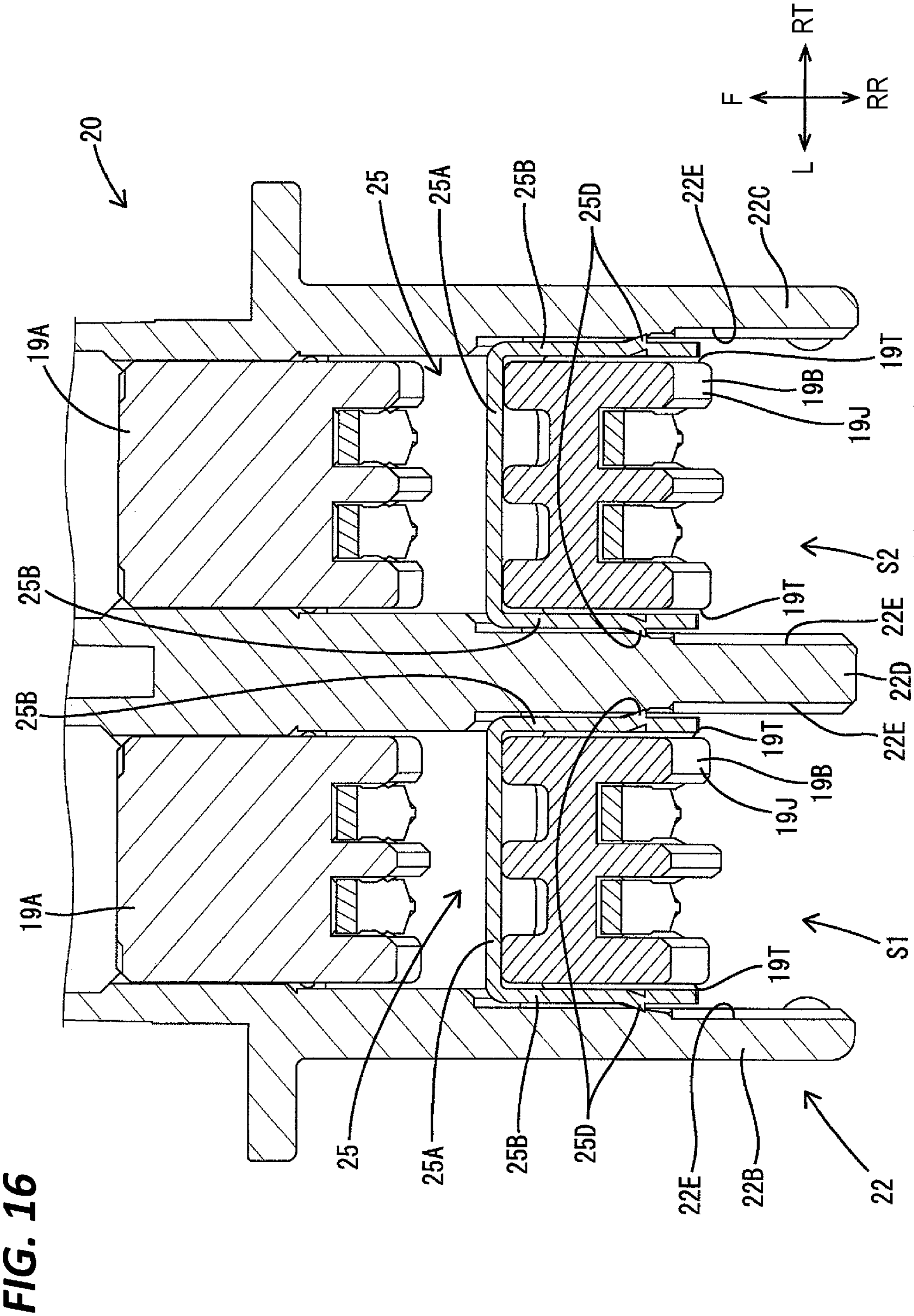
FIG. 16 is a section along E-E in FIG. 13.

As shown in FIGS. 15 and 16, the respective outer projecting portions 25D of the sandwiching portions 25B are inserted forward into the respective recesses 22E of the dielectric surrounding portion 22 from the rear ends of the recesses 22E. When reaching positions forward of the front ends of the respective recesses 22E, the respective outer projecting portions 25D slightly bite into the respective recesses 22E and are locked. That is, the respective outer projecting portions 25D are locked to the inner surfaces of the dielectric surrounding portion 22 of the outer conductor 20. At this time, the inner projecting portions 25E restrict the forward separation of the shield member 25 from the second dielectric 19B (see FIG. 12), and the outer projecting portions 25D restrict the rearward separation of the shield member 25 from the dielectric surrounding portion 22 of the outer conductor 20 (see FIGS. 15, 16). That is, the guiding portion 19J of the second dielectric 19B is indirectly restricted from coming out from the dielectric surrounding portion 22 of the outer conductor 20 by the inner projecting portions 25E and the outer projecting portions 25D of the shield member 25.

Since the shield member 25 is mounted on the second dielectric 19B, the shield member 25 and the second dielectric 19B can be handled as a single component. For example, the second dielectric 19B can be accommodated into the outer conductor 20 by mounting a lower end part of the second dielectric 19B mounted with the shield member 25 on a surface of an unillustrated jig and moving the outer conductor 20 so that the lower end edge of the dielectric surrounding portion 22 extends along the surface of this jig. That is, in this embodiment, the shield member 25 needs not be gripped (chucked) using a special jig.

Figure 17:
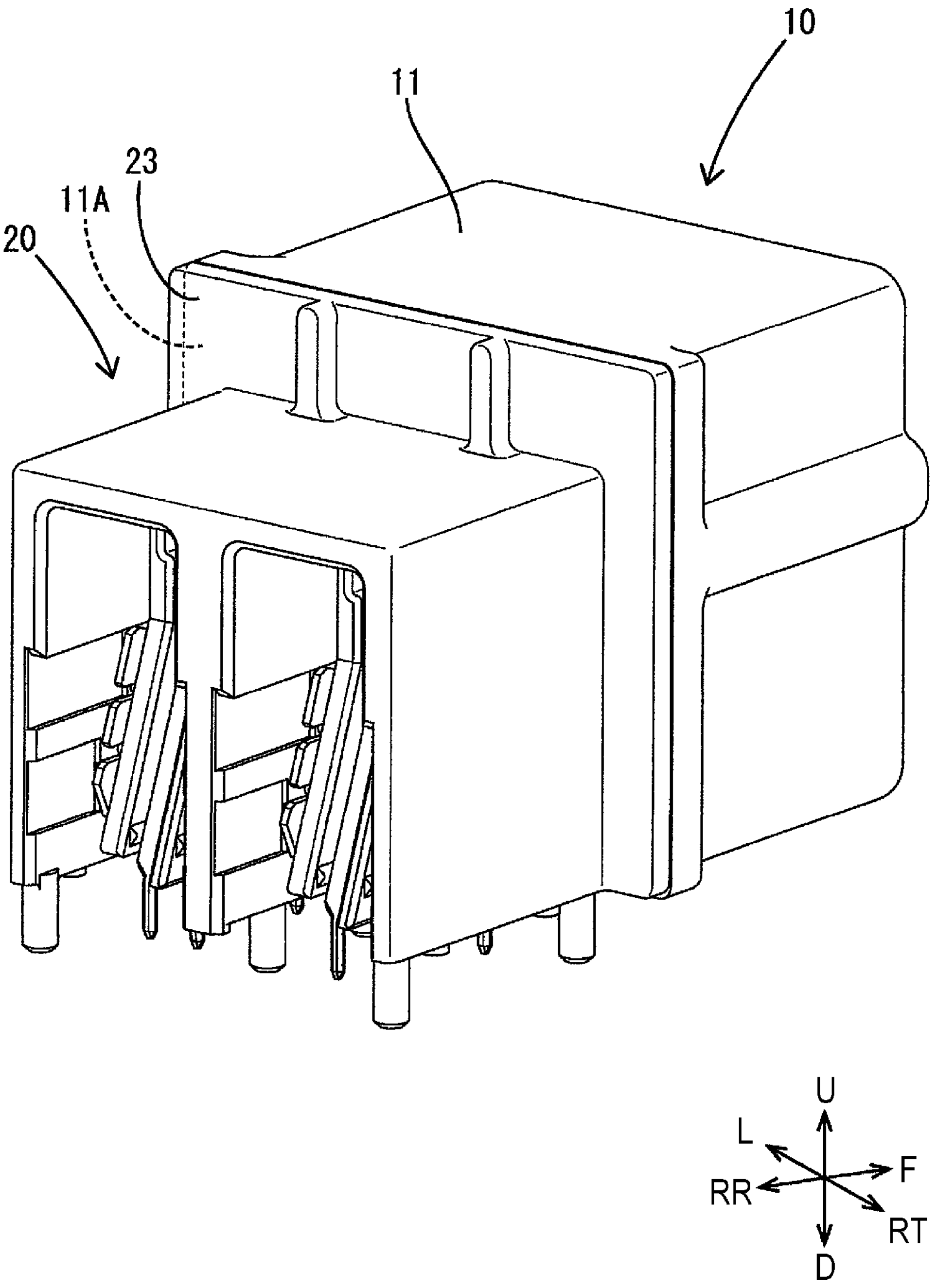
FIG. 17 is a perspective view showing a state where the outer conductor is accommodated in a housing.

Subsequently, the tube portions 21 of the outer conductor 20 are inserted into the holes 11B of the housing 11 from behind to accommodate the outer conductor 20 into the housing 11 (see FIG. 1). In this way, as shown in FIG. 17, the assembling of the connector 10 is completed.

As shown in FIG. 16, with the first dielectrics 19A and the second dielectrics 19B accommodated in the outer conductor 20, the shielding body portions 25A of the shield members 25 are arranged rearward of the first dielectrics 19A and forward of the guiding portions 19J of the second dielectric 19B. That is, the shielding body portions 25A of the shield members 25 are arranged between the first dielectrics 19A and the second dielectrics 19B adjacent in the front-rear direction in the outer conductor 20. The first dielectrics 19A are located on a front side in the assembling direction with the outer conductor 20, and the guiding portions 19J of the second dielectrics 19B are located behind the first dielectrics 19A in the assembling direction.

Further, as shown in FIGS. 15 and 16, the respective sandwiching portions 25B are sandwiched by the side surfaces 19T of the second dielectrics 19B and the inner surfaces of the dielectric surrounding portion 22 of the outer conductor 20 with the second dielectrics 19B accommodated in the outer conductor 20.

Further, as shown in FIGS. 9 and 14, with the first dielectrics 19A and the second dielectrics 19B accommodated in the outer conductor 20, the straight portions 28A, 28B projecting further forward than the fixing portions 19C, 19H are accommodated in the tube portions 21. Further, as shown in FIGS. 8 and 13, with the first dielectrics 19A and the second dielectrics 19B accommodated in the outer conductor 20, the lower end parts of the bent portions 28B, 28D project further downward than the dielectric surrounding portion 22. The lower end parts of the bent portions 28B, 28D projecting further downward than the dielectric surrounding portion 22 are mounted into the mounting holes formed in the circuit board and soldered to conductive paths for signals formed on the circuit board, thereby being electrically connected to the conductive paths for signals.

Next, functions and effects of this embodiment are described.

The connector 10 of the present disclosure includes the outer conductor 20, the plurality of dielectrics 19, the inner conductors 18, the shield members 25 and the locking portions 26. The plurality of dielectrics 19 are accommodated into the outer conductor 20. The inner conductors 18 are mounted into each dielectric 19. The shield members 25 are arranged between the dielectrics 19 adjacent in the outer conductor 20. The locking portions 26 lock the shield members 25 to the dielectrics 19. According to this configuration, since the locking portions 26 lock the shield members 25 to the dielectrics 19, the dielectrics 19 mounted with the shield members 25 can be accommodated into the outer conductor 20. Thus, it is not necessary to perform an assembling operation such as the insertion of the shield member 25 into the outer conductor 20 with the shield member 25 gripped and the connector 10 can be easily assembled.

The dielectrics 19 of the connector 10 of the present disclosure include the first dielectrics 19A located on the front side in the assembling direction with the outer conductor 20 and the second dielectrics 19B located behind the first dielectrics 19A in the assembling direction. The shield members 25 are locked to the second dielectrics 19B by the locking portions 26. According to this configuration, if the first dielectrics 19A having the shield members 25 locked thereto are first accommodated into the outer conductor 20, there is a concern that the second dielectrics 19B accommodated into the outer conductor 20 later accidentally contact the shield members 25 and the shield members 25 deviate from proper positions. In contrast, if the shield members 25 are locked to the second dielectrics 19B located behind the first dielectrics 19A in the assembling direction (i.e. if the second dielectrics 19B are accommodated into the outer conductor 20 after the first dielectrics 19A), the shield members 25 can be made less likely to deviate from the proper positions.

The shield member 25 of the connector 10 of the present disclosure includes the pair of sandwiching portions 25B facing each other at a distance from each other. The second dielectric 19B has the pair of side surfaces 19T facing the respective sandwiching portions 25B. The locking portions 26 are provided on the respective side surfaces 19T of the second dielectric 19B and the respective sandwiching portions 25B. According to this configuration, the shield member 25 can be easily locked to the second dielectric 19B by being sandwiched by the sandwiching portions 25B.

The locking portion 26 of the connector 10 of the present disclosure includes the protrusions 19N projecting from the side surface 19T and extending in the assembling direction and the grooves 25C formed in the sandwiching portion 25B and extending in the assembling direction, and the protrusions 19N are fit into the grooves 25C. According to this configuration, the shield member 25 and the second dielectric 19B are prevented from being separated in a direction intersecting the assembling direction.

The shield member 25 of the connector 10 of the present disclosure is arranged forward of the second dielectric 19B and the sandwiching portions 25B include the inner projecting portions 25E for restricting the forward separation of the shield member 25 by being locked to the second dielectric 19B. According to this configuration, since the forward separation of the shield member 25 from the second dielectric 19B is restricted by the inner projecting portions 25E, the shield member 25 can be maintained in a state locked to the second dielectric 19B.

With the second dielectric 19B accommodated in the outer conductor 20, the sandwiching portions 25B of the connector 10 of the present disclosure are sandwiched by the side surfaces 19T of the second dielectric 19B and the inner surfaces of the outer conductor 20, and the sandwiching portions 25B include the outer projecting portions 25D to be locked to the inner surfaces of the outer conductor 20. According to this configuration, the second dielectric 19B can be indirectly held in a state accommodated in the outer conductor 20 by the sandwiching portions 25B including the outer projecting portions 25D and the inner projecting portions 25E, and the separation of the second dielectric 19B from the outer conductor 20 can be suppressed.

Other Embodiments

The number of the first dielectrics and the number of the second dielectrics are not limited to the numbers disclosed in the above embodiment. Further, the number of the inner conductors for each of the first and second dielectrics is also not limited to the number disclosed in the above embodiment.

Unlike the above embodiment, the outer and inner projecting portions may be provided only on one sandwiching portion. Further, the number of the protrusions of the guiding portion may be three or less or five or more. Further, the sandwiching portions may be provided with protrusions projecting toward the side surfaces of the guiding portion and the guiding portion may be formed with grooves into which the protrusions are fit.

Unlike the above embodiment, only the protrusions and the grooves may be provided without providing the outer and inner projecting portions. Further, only the outer and inner projecting portions may be provided without providing the protrusions and the grooves.

Unlike the above embodiment, shield members may be mounted on the first dielectrics from behind.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising:

an outer conductor;

a plurality of dielectrics accommodated into the outer conductor;

a plurality of inner conductors mounted into each of the plurality of dielectrics;

a shield member arranged between the plurality of dielectrics adjacent in the outer conductor; and a locking portion configured to lock the shield member to one of the plurality of dielectrics in a direction opposite to an assembling direction of the plurality of dielectrics with respect to the outer conductor.

2. The connector of claim 1, wherein:

the plurality of dielectrics includes a first dielectric located on a front side in the assembling direction with respect to the outer conductor, and a second dielectric located behind the first dielectric in the assembling direction, and the shield member is locked to the second dielectric by the locking portion.

3. The connector of claim 2, wherein:

the shield member includes a pair of sandwiching portions facing each other at a distance from each other, the second dielectric has a pair of side surfaces facing the respective sandwiching portions, and the locking portion is provided on the respective side surfaces of the second dielectric and the respective sandwiching portions.

4. The connector of claim 3, wherein:

the locking portion includes protrusions projecting from the respective side surfaces and extending in the assembling direction and grooves formed in the respective sandwiching portions and extending in the assembling direction, and the protrusions are fit into the grooves.

5. The connector of claim 3, wherein:

the shield member is arranged forward of the second dielectric in the assembling direction with respect to the outer conductor, and the sandwiching portions include first restricting claws configured to restrict forward separation of the shield member by being locked to the second dielectric.

6. The connector of claim 3, wherein:

the sandwiching portions are sandwiched by the side surfaces of the second dielectric and inner surfaces of the outer conductor with the second dielectric accommodated in the outer conductor, and the sandwiching portions include second restricting claws to be locked to the inner surfaces of the outer conductor.

7. The connector of claim 1, wherein the plurality of dielectrics is accommodated into the outer conductor together with the shield member in the assembling direction of the plurality of dielectrics.

* * * * *